(12) United States Patent
Uchida et al.

(10) Patent No.: US 11,531,576 B2
(45) Date of Patent: Dec. 20, 2022

(54) MAINTENANCE RECOMMENDATION SYSTEM

(71) Applicant: Hitachi, Ltd., Tokyo (JP)

(72) Inventors: Takayuki Uchida, Tokyo (JP); Tomoaki Hiruta, Tokyo (JP); Toshiaki Kono, Tokyo (JP); Yasuharu Namba, Tokyo (JP)

(73) Assignee: HITACHI, LTD., Tokyo (JP)

( * ) Notice: Subject to any disclaimer, the term of this patent is extended or adjusted under 35 U.S.C. 154(b) by 301 days.

(21) Appl. No.: 16/802,617

(22) Filed: Feb. 27, 2020

(65) Prior Publication Data

US 2020/0341828 A1 Oct. 29, 2020

(30) Foreign Application Priority Data

Apr. 23, 2019 (JP) .............................. JP2019-081629

(51) Int. Cl.
| | |
|---|---|
| *G06F 11/00* | (2006.01) |
| *G06F 17/18* | (2006.01) |
| *G06F 16/901* | (2019.01) |

(52) U.S. Cl.
CPC ........ *G06F 11/008* (2013.01); *G06F 16/9027* (2019.01); *G06F 17/18* (2013.01)

(58) Field of Classification Search
CPC .... G06F 11/008; G06F 16/9027; G06F 17/18; G06F 11/0751
See application file for complete search history.

(56) References Cited

U.S. PATENT DOCUMENTS

| | | | | |
|---|---|---|---|---|
| 9,270,518 | B2 * | 2/2016 | Muro | ..................... G06Q 10/06 |
| 2003/0236789 | A1 * | 12/2003 | Agrawal | ............. G06F 16/2264 |
| | | | | 703/2 |
| 2005/0262394 | A1 * | 11/2005 | Yasukawa | ........... G06F 11/0748 |
| | | | | 714/E11.026 |

(Continued)

FOREIGN PATENT DOCUMENTS

| | | | |
|---|---|---|---|
| JP | 2007-193456 A | | 8/2007 |
| JP | 2015162090 A | * | 9/2015 |
| JP | 2017-68467 A | | 4/2017 |

OTHER PUBLICATIONS

Japanese Office Action received in corresponding Japanese Application No. 2019-081629 dated Oct. 25, 2022.

*Primary Examiner* — Stacy Whitmore
(74) *Attorney, Agent, or Firm* — Mattingly & Malur, PC

(57) ABSTRACT

The invention provides a maintenance recommendation system in which an inspection item is presented timely in the halfway of an inspection, accuracy of failure mode identification is improved, a failure mode is identified at an early stage, meanwhile, a time required for investigating a content of the failure is reduced, and a time from device failure to reset is shortened. The maintenance recommendation system includes: a primary storage unit that stores an input inspection result; a failure mode probability calculation unit that is configured to calculate a probability of a failure mode based on the inspection result stored in the primary storage unit; an inspection item search unit that is configured to extract an inspection item with the minimum inspection score from uninspected inspection items; and a main routine operation unit that is configured to narrow down a failure mode candidate and an inspection item candidate from all inspection items.

6 Claims, 13 Drawing Sheets

(56) References Cited

U.S. PATENT DOCUMENTS

| | | | |
|---|---|---|---|
| 2009/0112865 A1* | 4/2009 | Vee | G06F 16/35 |
| | | | 707/E17.084 |
| 2015/0269120 A1* | 9/2015 | Nakatsugawa | G06K 9/00 |
| | | | 703/2 |
| 2019/0155869 A1* | 5/2019 | Wang | G06Q 10/20 |
| 2019/0162632 A1* | 5/2019 | Uchida | G01M 99/005 |
| 2019/0236556 A1* | 8/2019 | Morisawa | G06Q 10/067 |
| 2019/0266682 A1* | 8/2019 | Grussing | G06Q 10/06313 |
| 2019/0332462 A1* | 10/2019 | Kono | G06F 11/0778 |
| 2020/0081756 A1* | 3/2020 | Uchida | G06F 11/3058 |
| 2020/0192890 A1* | 6/2020 | Hiruta | G07C 5/00 |
| 2021/0405610 A1* | 12/2021 | Uchida | G05B 19/4063 |

\* cited by examiner

FIG. 2

185 INSPECTION ITEM PROBABILITY TABLE

| FAILURE MODE 200 | INSPECTION PORTION 210 | INSPECTION ITEM 220 | INSPECTION ITEM BEHAVIOR 225 | PROBABILITY P AT WHICH INSPECTION ITEM OCCURS (INSPECTION ITEM BEHAVIOR \| FAILURE MODE) 230 |
|---|---|---|---|---|
| REDUCTION OF CONDENSER COOL WATER | POWER SUPPLY PORTION | INPUT POWER | INCREASE | 0.30 |
| REDUCTION OF CONDENSER COOL WATER | CONDENSER | OUTLET TEMPERATURE | INCREASE | 0.20 |
| REFRIGERANT LEAKAGE | POWER SUPPLY PORTION | INPUT POWER | DECREASE | 0.25 |
| REFRIGERANT LEAKAGE | CONDENSER | PRESSURE | INCREASE | 0.35 |
| REDUCTION OF EVAPORATOR COOL WATER | EVAPORATOR | INLET TEMPERATURE | INCREASE | 0.20 |
| REDUCTION OF EVAPORATOR COOL WATER | POWER SUPPLY PORTION | INPUT POWER | INCREASE | 0.10 |
| ... | ... | ... | ... | ... |

| FAILURE MODE | TREATMENT COST |
|---|---|
| REDUCTION OF CONDENSER COOL WATER | 2 |
| REFRIGERANT LEAKAGE | 5 |
| REDUCTION OF EVAPORATOR COOL WATER | 3 |
| : | : |

| INSPECTION PORTION | INSPECTION ITEM | INSPECTION ITEM BEHAVIOR | INSPECTION RESULT (1: SAME AS BEHAVIOR 0: NOT SAME AS BEHAVIOR) |
|---|---|---|---|
| POWER SUPPLY PORTION | INPUT POWER | INCREASE | |
| CONDENSER | OUTLET TEMPERATURE | INCREASE | 1 |
| CONDENSER | PRESSURE | INCREASE | 0 |
| | : | | : |

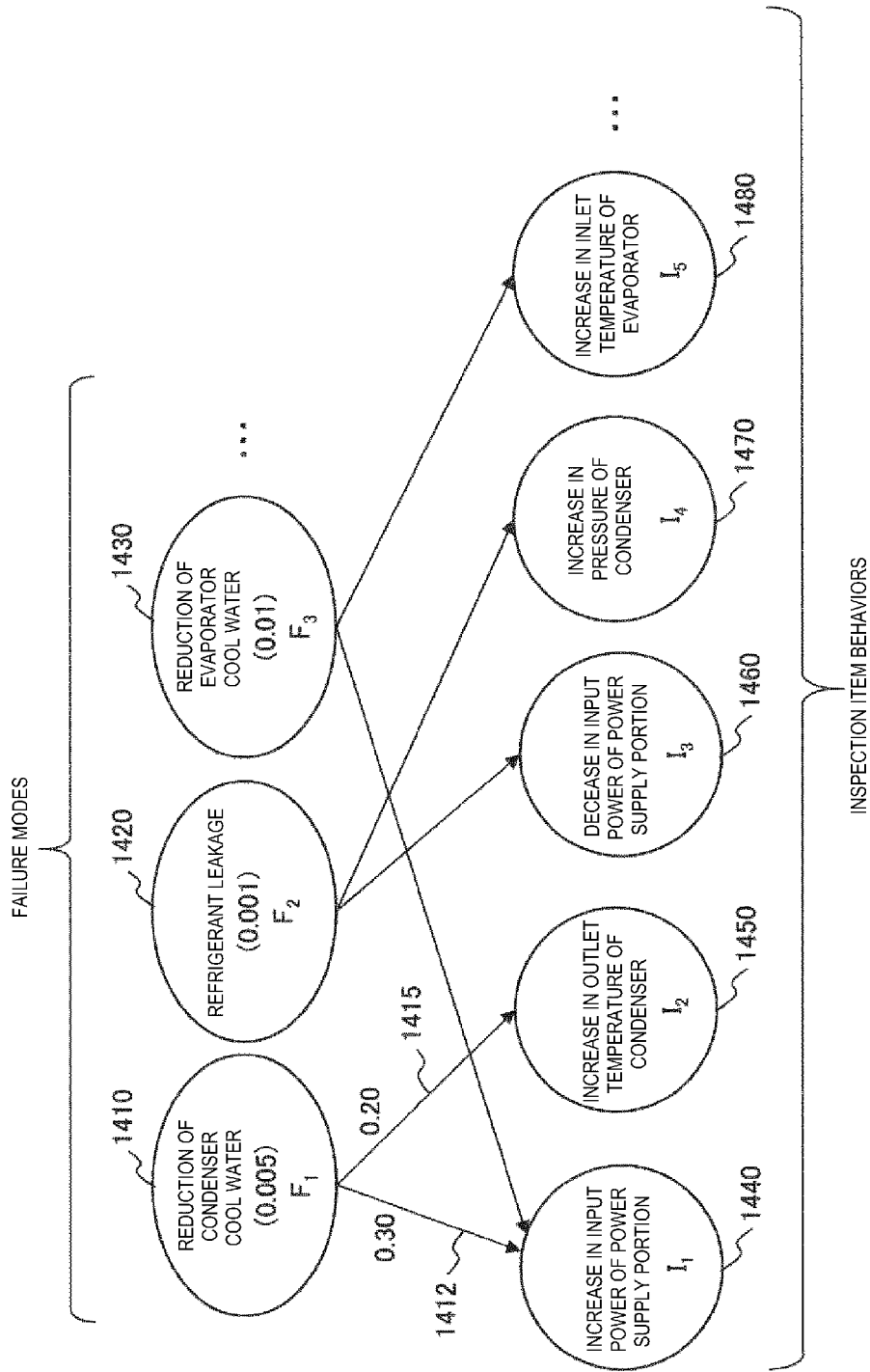

MAINTENANCE RECOMMENDATION SYSTEM

CLAIM OF PRIORITY

The present application claims priority from Japanese Patent application serial no. 2019-81629, filed on Apr. 23, 2019, the content of which is hereby incorporated by reference into this application.

BACKGROUND OF THE INVENTION

1. Field of the Invention

The present invention relates to a maintenance recommendation system.

2. Description of the Related Art

In order to operate a device, maintenance of the device is indispensable. In particular, when the device fails, it is required to quickly investigate a content of the failure, deal with the failure, and re-operate (reset) the device. When the content of the failure is investigated for the device, it is important to inspect each portion of the device and to identify a failure mode which is a state of each portion of the device in which the failure occurs.

JP-A-2007-193456 (Patent Literature 1) describes a background technique of this technical field. Patent Literature 1 describes a process management device (factor estimation device) that optimizes operation sharing and an operation sequence between a man and a machine for a cooperative diagnosis between the man and the machine. Further, the Patent Literature 1 discloses the process management device including: an input item selecting section which includes a predicted variation of certainty factor calculating section for finding difference between a predicted certainty factor which is a certainty factor in a state that a characteristic quantity is set up to an un-input condition and the current certainty factor for each bad factor, and an input effect calculating section where a user determines the characteristic quantity corresponding to the target un-input condition, finds the input effect of the target un-input condition calculated by dividing the characteristic quantity with either smaller one of user cost for inputting cost and machine cost for calculating the characteristic quantity corresponding to the target un-input condition based on result data of investigation for every target un-input condition, and determines the un-input condition for maximizing the input effect (see abstract).

The factor estimation device described in Patent Literature 1 finds the difference between the predicted certainty factor and the current certainty factor for each bad factor, and finds the input effect of the target un-input condition for each un-input condition. As described above, in Patent Literature 1, a series of failure factors (inspection items) are found, and a series of inspection items are presented only once.

However, in practice, during a process of executing an inspection on the inspection items, for example, inspection items 1 to 10 for each portion of the device, the inspection may be determined as sufficient already based on past inspection results, and the inspection maybe stopped halfway. Further, for example, based on inspection results of the inspection items 1 to 3, it can be determined that it is preferable to execute an inspection of other inspection items different from the inspection items 4 to 10 initially presented, and this inspection of other inspection items is executed, so that accuracy of failure mode estimation is improved, and the failure mode can be identified at an early stage.

SUMMARY OF THE INVENTION

Therefore, the invention provides a maintenance recommendation system in which an inspection item is presented timely in the halfway of an inspection, accuracy of failure mode identification is improved, a failure mode is identified at an early stage, meanwhile, a time required for investigating a content of the failure is reduced, and a time from device failure to reset is shortened.

In order to solve above problem, a maintenance recommendation system of the invention includes: a primary storage unit that stores an input inspection result; a failure mode probability calculation unit that is configured to calculate a probability of a failure mode based on the inspection result stored in the primary storage unit; an inspection item search unit that is configured to extract an inspection item with the minimum inspection score from uninspected inspection items; and a main routine operation unit that is configured to narrow down a failure mode candidate and an inspection item candidate from all inspection items.

According to the invention, a maintenance recommendation system can be provided in which an inspection item is presented timely in the halfway of an inspection, accuracy of failure mode identification is improved, a failure mode is identified at an early stage, meanwhile, a time required for investigating a content of the failure is reduced, and a time from device failure to reset is shortened.

Problems, configurations, and effects other than those described above will become apparent from the following description of the embodiments.

BRIEF DESCRIPTION OF THE DRAWINGS

FIG. 2 is an explanatory diagram illustrating a data structure of an inspection item probability table 185 described in the embodiment.

FIG. 14 is an explanatory diagram illustrating an algorithm described in the embodiment.

DESCRIPTION OF THE PREFERRED EMBODIMENTS

Figure 1:
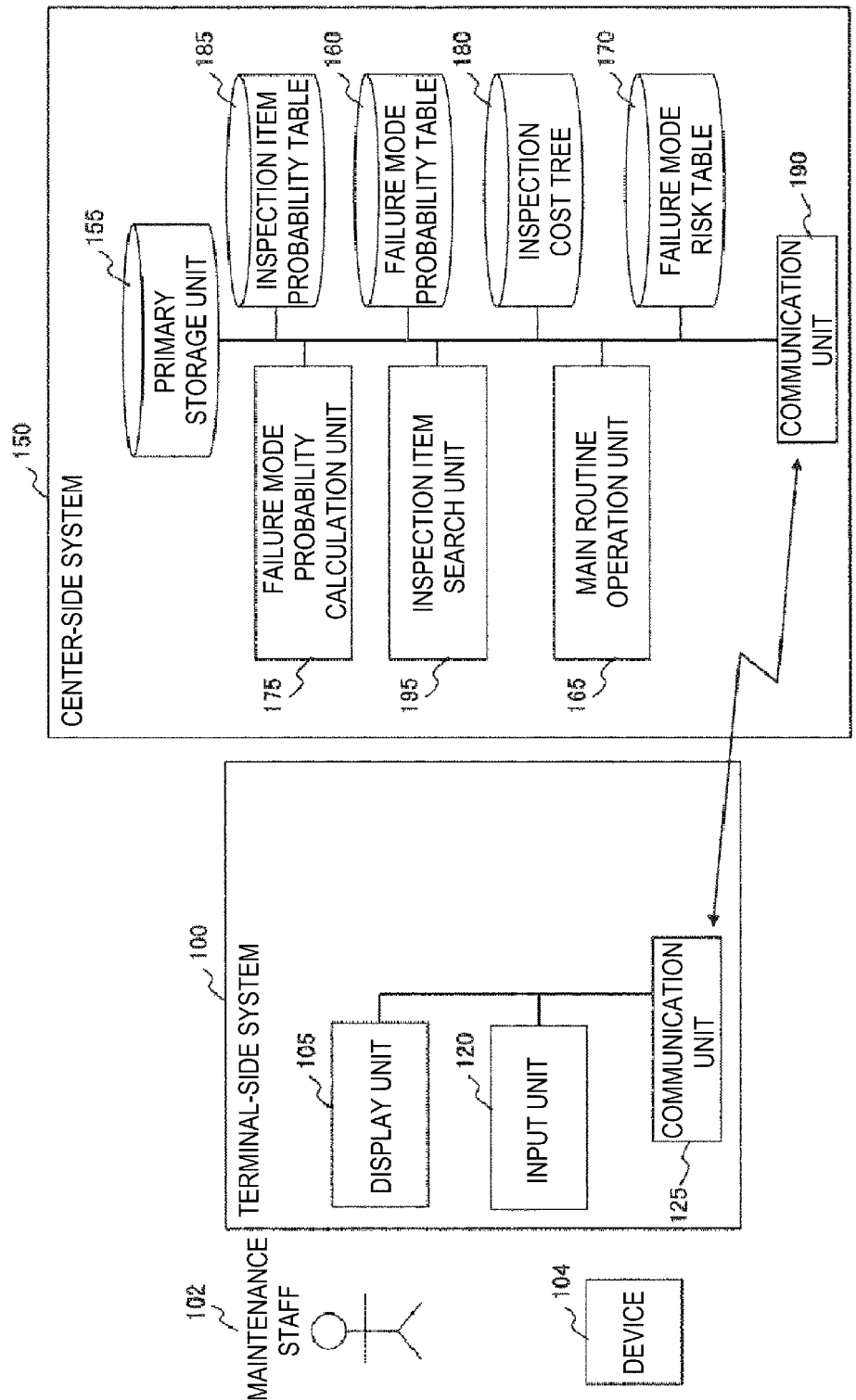
FIG. 1 is an overall configuration diagram illustrating an embodiment.

An embodiment of the invention will be described below with reference to the drawings. The same or similar configurations are denoted by the same reference numerals and in cases where a description is duplicated, the description thereof may be omitted.

First Embodiment

FIG. 1 is an overall configuration diagram illustrating the first embodiment.

A maintenance recommendation system described in the present embodiment supports maintenance of a device 104, and recommends an inspection portion when the device 104 fails, so as to identify a failure mode of the failure. Then, the failure mode is further estimated based on an inspection result of the inspection portion.

Here, the device 104 requires regular maintenance, and may be, for example, a power generator, a construction equipment, a medical equipment, an information equipment or the like, which are devices that require the regular maintenance. In the present embodiment, a refrigerator having a vapor compression type refrigerator will be used and described as the device 104.

In this embodiment, a maintenance staff 102 operates a terminal-side system (hereinafter, referred to as "terminal") 100. Then, the terminal 100 mutually communicates with a center-side system (hereinafter, referred to as "center") 150.

The terminal 100 is preferably a lightweight tablet or the like that can be easily carried to an operation site of the device 104 by the maintenance staff 102. The terminal 100 includes a display unit 105 such as a liquid crystal display, an input unit 120 such as a touch display, and a communication unit 125 that communicates with the center 150. Note that the display unit 105 and the input unit 120 may be one display. Further, the terminal 100 may be provided in the device 104.

For example, when the device 104 fails, the maintenance staff 102 investigates a content of the failure. Then, by inspecting each portion of the device 104 and inputting an inspection result thereof to the terminal 100, the maintenance staff 102 can acquire an inspection item to be inspected next and a failure mode.

The center 150 is the maintenance recommendation system described in the present embodiment, and is a system that receives the inspection result input to the terminal 100 via communication, and transmits the inspection item to be inspected next and the failure mode to the maintenance staff 102 via the communication. That is, the center 150 is a system that transmits an inspection item candidate and a failure mode candidate to the maintenance staff 102.

The center 150 includes a primary storage unit 155 that stores the inspection result input by the maintenance staff 102, a failure mode probability calculation unit 175 that is configured to calculate a probability of the failure mode based on the inspection result stored in the primary storage unit 155, an inspection item search unit 195 that is configured to extract an inspection item with the minimum inspection score from uninspected inspection items and search for an inspection item candidate which is the inspection item to be inspected, an inspection item probability table 185 that stores probabilities at which the inspection items occur, a failure mode probability table 160 that stores occurrence probabilities of the failure mode, an inspection cost tree 180 that stores inspection costs in a tree-diagram, a failure mode risk table 170 that stores treatment costs (corresponding to repair costs as a risk) of the failure mode, a communication unit 190 that mutually communicates with the terminal 100, and a main routine operation unit 165 that is configured to operate a main routine to narrow down the failure mode candidate and the inspection item candidate from all inspection items. The center 150 may be provided in the device 104.

In particular, the failure mode probability calculation unit 175 refers to the failure mode probability table 160 and the inspection item probability table 185, while the inspection item search unit 195 refers to the inspection cost tree 180, the failure mode risk table 170 and the inspection item probability table 185.

Hereinafter, data structures of each table that stores data necessary for each process (operation, calculation, and search) will be described. Note that data other than the data stored in the primary storage unit 155 is defined (stored) when, for example, the maintenance recommendation system is designed.

FIG. 2 is an explanatory diagram illustrating a data structure of the inspection item probability table 185 described in the embodiment.

The inspection item probability table 185 is a table that stores "probabilities (probability when the inspection item occurs) 230 at which an inspection item 220 behave like an inspection item behavior 225 when a failure mode 200 occurs".

The probabilities 230 are conditional probabilities (statistical term), and are conditional probabilities P (inspection item behavior=True|failure mode=True) at which the inspection item behavior 225 occurs when the failure mode 200 occurs.

For example, referring to a first row of the table illustrated in FIG. 2, when the failure mode 200 (reduction of condenser cool water) occurs, the probability P 230 at which the inspection item with the inspection item behavior (increase) occurs (inspection item behavior|failure mode) is 0.30 (conditional probability), where the inspection portion 210 is a power supply portion, and the inspection item 220 is input power.

Note that a value of the probability P is not necessarily an exact value. For example, the value of the probability P can be estimated based on experience of a designer of the device 104 and experience of the maintenance staff 102, and can be estimated based on a failure rate of a reliability database of the device 104, a failure rate based on past experimental data, a failure rate of a failure simulation based on a physical model and the like.

Figure 3:
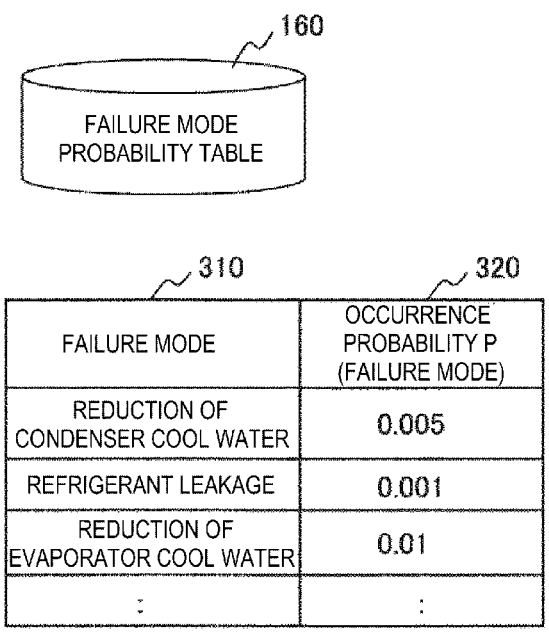
FIG. 3 is an explanatory diagram illustrating a data structure of a failure mode probability table 160 described in the embodiment.

FIG. 3 is an explanatory diagram illustrating a data structure of the failure mode probability table 160 described in the embodiment.

The failure mode probability table 160 is a table that stores a failure mode 310 and an occurrence probability P (failure mode) 320 thereof.

The failure modes 310 same as the failure modes 200 illustrated in FIG. 2 are stored.

The occurrence probability P320 is not a conditional probability but a general probability at which the failure mode 310 may occur. The occurrence probability P320 can be calculated based on the number of occurrences of the failure mode 310 that actually occurred in the past, and an occurrence probability described in a failure mode and an effect analysis (FMEA) of the device 104 can also be used as the occurrence probability P320.

For example, referring to a first row of the table illustrated in FIG. 3, the occurrence probability P320 at which the failure mode 310 (reduction of condenser cool water) occurs is 0.005.

The failure mode probability calculation unit 175 can calculate a probability of the failure mode based on the probability P 230 (conditional probability) at which the inspection item occurs (inspection item behavior I failure mode) described in the inspection item probability table 185, and based on the occurrence probability P320 described in failure mode probability table 160.

Figure 4:
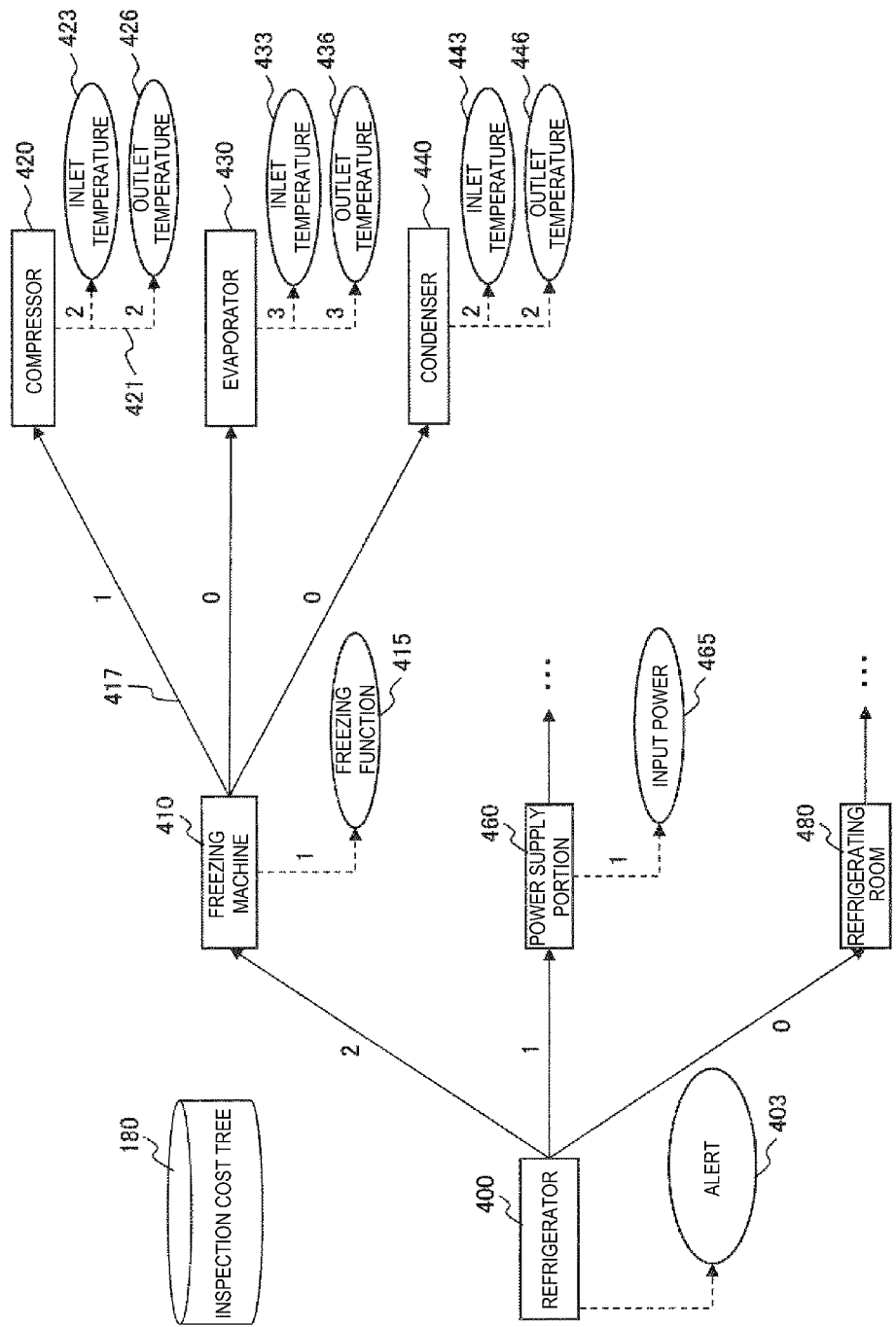
FIG. 4 is an explanatory diagram illustrating a data structure of an inspection cost tree 180 described in the embodiment.

FIG. 4 is an explanatory diagram illustrating a data structure of the inspection cost tree 180 described in the embodiment.

The inspection cost tree 180 is data indicating inspection portions constituting a refrigerator 400 (the device 104) in a tree structure. It is possible to estimate a necessary inspection cost for executing inspection of the inspection item based on the data.

Squares in the tree structure indicate portions that constitute the device. For example, the refrigerator 400 is configured with portions including a freezing machine 410, a power supply portion 460 and a refrigerating room 480. Further, the freezing machine 410 is configured with portions including a compressor 420, an evaporator 430 and a condenser 440. In addition, these portions constituting the device correspond to the inspection portions.

Ellipses in the tree structure indicate the inspection items for these portions constituting the device. For example, an inlet temperature 423 indicates an inspection item referred to as an inlet temperature of the compressor 420. This inspection item is information associated with the inspection item 220 illustrated in FIG. 2.

Further, costs required to disassemble the portions constituting the device are set as numerical values on solid lines connecting a portion (square) constituting the device and a portion (square) constituting the device. For example, a numerical value "1" is set on a solid line 417. This indicates, for example, an operation cost for opening a case of the freezing machine 410 and making the compressor 420 to appear and the like, that is, an operation cost (operation time, tools required for disassembly, costs required for procurement of people, and the like) for disassembling the portions constituting the device.

Further, costs required to inspect the portions constituting the device are set as numerical values on dotted lines connecting a portion (square) constituting the device and an inspection item (ellipse). For example, a numerical value "2" is set on a dotted line 421. This indicates, for example, an inspection cost for measuring an outlet temperature 426 in a state where the compressor 420 appears, that is, an inspection cost for inspecting the portions constituting the device.

The inspection cost is defined by estimating, based on a maintenance manual and the like, time required for operations, such as providing sensors on the portions constituting the device to measure temperatures, pressures, powers and the like, or a simple visual inspection, and procurement of tools.

As described above, a total cost required for the inspection can be calculated by calculating a sum of the operation cost defined on the solid line and the inspection cost defined on the dotted line.

For example, when the outlet temperature 426 (inspection item) of the compressor 420 (inspection portion) of the freezing machine 410 (inspection portion) of the refrigerator 400 (inspection portion) is to be inspected, a total cost "5" required for the inspection is calculated by calculating a sum (2+1+2=5) of the operation costs "2+1" defined on the solid lines and the inspection cost "2" defined on the dotted line.

The numerical values used for the inspection cost and the operation cost are obtained by dividing these costs into ranks set in advance. Further, a parameter in the data structure is not necessarily limited to the cost, and another parameter (such as time) may be used.

Figure 5:
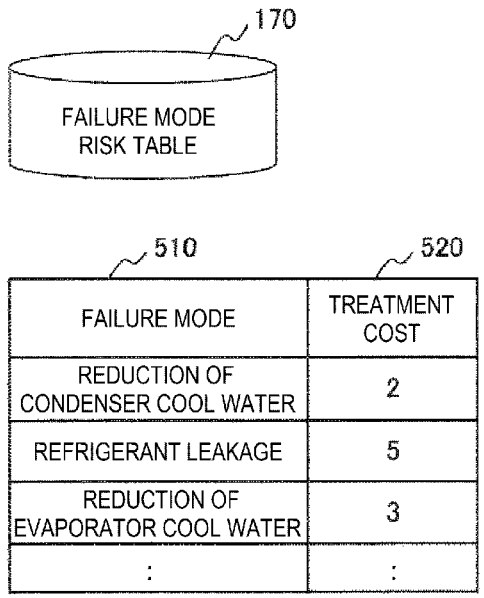
FIG. 5 is an explanatory diagram illustrating a data structure of a failure mode risk table 170 described in the embodiment.

FIG. 5 is an explanatory diagram illustrating a data structure of the failure mode risk table 170 described in the embodiment.

The failure mode risk table 170 is a table that stores a failure mode 510 and a treatment cost 520 thereof.

The failure modes 510 same as the failure modes 200 illustrated in FIG. 2 and the failure modes 310 illustrated in FIG. 3 are stored.

Further, the treatment cost 520 is a cost required for treating the failure mode 510 and repairing the device 104.

For example, referring to a first row of the table illustrated in FIG. 5, the treatment cost 520 of the failure mode 510 (reduction of condenser cool water) is 2. For example, costs of operations, such as removing an object blocking an exit and an entrance of the condenser, are stored in the treatment costs 520. Further, when the failure mode 510 is "refrigerant leakage" for example, a cost of operations, such as searching where a refrigerant leak and blocking up the refrigerant leakage, is stored in the treatment cost 520.

The treatment cost 520 is presented to the maintenance staff 102 simultaneously with the probability of the failure modes, so that the maintenance staff 102 can be supported (assisted) in selecting the failure mode. That is, when the probabilities of all the failure modes are equal or there is no significant difference between the probabilities of all the failure modes, the maintenance staff 102 can select the failure mode by referring to the treatment costs 520. In this way, the maintenance staff 102 can be supported (assisted) in selecting the failure mode.

In this way, when the probabilities of all the failure modes are equal or there is no significant difference between the probabilities of all the failure modes, the maintenance staff 102 firstly can treat a failure mode of which the treatment cost 520 is small, and when the device does not reset even though the failure mode is treated, the maintenance staff 102 can treat a failure mode of which the treatment cost 520 is large.

For example, when a probability of the failure mode 510 "refrigerant leakage" is 20% (treatment cost "5") and a probability of the failure mode 510 "reduction of condenser cool water" is 20% (treatment cost "2"), firstly, the "reduction of condenser cool water" of which the treatment cost is "2" is treated, and then when the device does not reset, the "refrigerant leakage" can be treated.

Further, for example, when probabilities of the "reduction of condenser cool water" (treatment cost "2") and "reduction of evaporator cool water" (treatment cost "3") are 45%, and the probability of the "refrigerant leakage" (treatment cost "5") is 50%, it is not always reasonable to assume the "refrigerant leakage" as the failure mode and check where the refrigerant leaks, only because the probability of the failure mode is 5% greater.

Such support (assistant) can be performed by presenting the treatment cost 520 in parallel with the probability of the failure mode.

Figure 6:
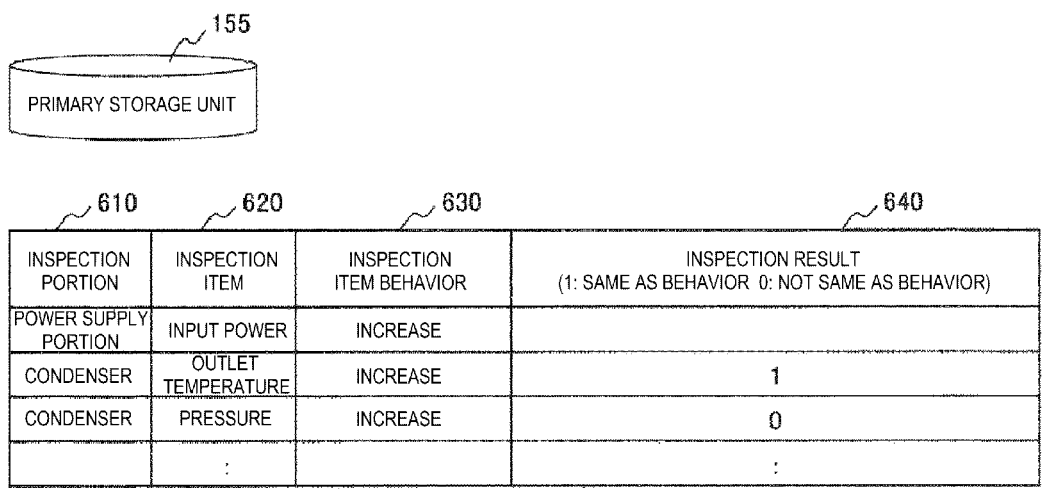
FIG. 6 is an explanatory diagram illustrating a data structure of a primary storage unit 155 described in the embodiment.

FIG. 6 is an explanatory diagram illustrating a data structure of the primary storage unit 155 described in the embodiment.

The primary storage unit 155 is different from the inspection item probability table 185, the failure mode probability table 160, the inspection cost tree 180 and the failure mode risk table 170, and is configured with a rewritable device such as a random-access memory (RAM). This is because the maintenance staff 102 stores the inspected inspection results.

Then, the inspection item to be inspected next and the failure mode can be obtained from the inspection results.

As the data structure, inspection portions 610, inspection items 620, and inspection item behaviors 630 are stored the same as the inspection portions 210, the inspection items 220, and the inspection item behaviors 225 illustrated in FIG. 2.

Then, among the inspection portions 210, the inspection items 220, and the inspection item behaviors 225 illustrated in FIG. 2, a row where the inspection is completed is copied and stored.

An inspection result 640 is a result of the inspection performed by the maintenance staff 102. If it is a behavior as defined by the inspection item behavior 630, "1" is stored, and if it is not a behavior as defined by the inspection item behavior 630, "0" is stored.

Next, processing (operation, calculation, and search) to be executed by the main routine operation unit 165, the failure mode probability calculation unit 175, and the inspection item search unit 195 will be described.

Figure 7:
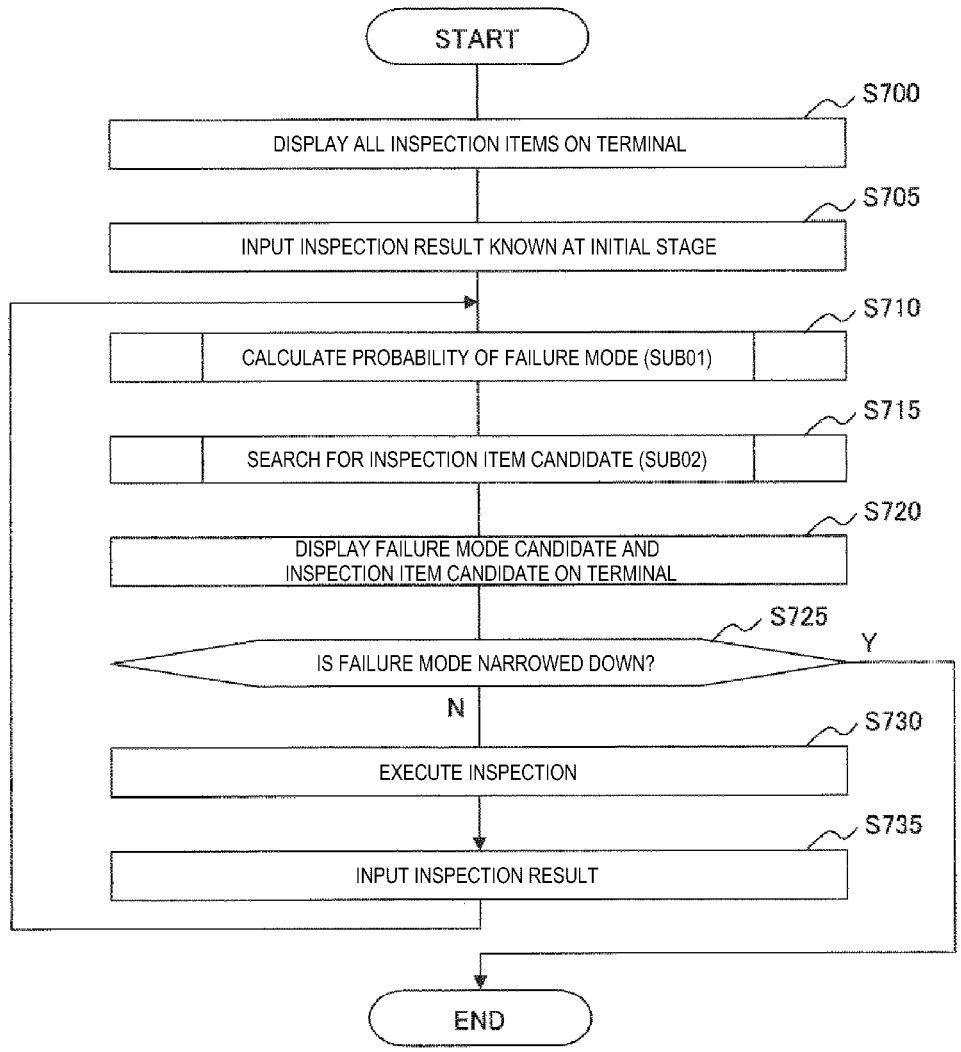
FIG. 7 is a flowchart illustrating a main routine of a processing content described in the embodiment.

FIG. 7 is a flowchart illustrating a main routine of processing content described in the embodiment.

The main routine illustrated in FIG. 7 is a procedure that is executed by the main routine operation unit 165 to specify the failure mode of the device 104.

Step (hereinafter referred to as "S") 700 is a process of displaying all inspection items on the display unit 105 of the terminal 100. Here, all records are read to display the inspection portions 210, the inspection items 220, and the inspection item behaviors 225 which are stored in the inspection item probability table 185 (see FIG. 2).

Figure 10:
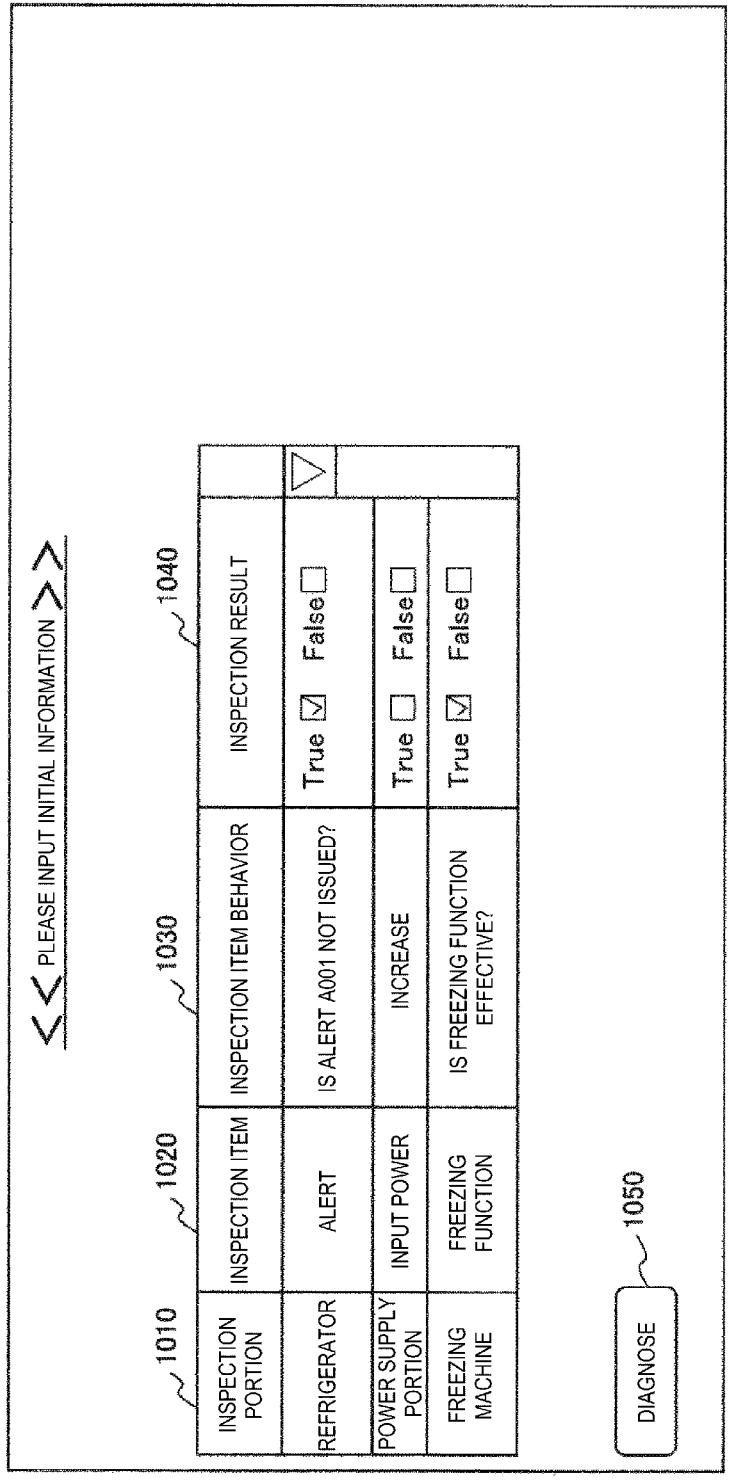
FIG. 10 is an explanatory diagram illustrating input of initial information displayed by a display unit 105 described in the embodiment.

FIG. 10 is an explanatory diagram illustrating input of initial information displayed by a display unit 105 described in the embodiment.

The inspection portion 210, the inspection item 220 and the inspection item behavior 225 stored in the inspection item probability table 185 are displayed as inspection portion 1010, inspection item 1020, and inspection item behavior 1030.

An inspection result 1040 is "True" when the inspection item 1020 has a behavior like the inspection item behavior 1030, and the inspection result 1040 is "False" when the inspection item 1020 does not have the behavior like the inspection item behavior 1030. In order to be capable of inputting the above-mentioned inspection results, words "True" and "False" and check boxes are displayed. That is, the input inspection results are executed for the inspection item behaviors of the inspection portions.

S705 is a step of inputting an inspection result known at an initial stage. In this step, the inspection result (the initial information) known at this initial stage (current time) is input, and unknown inspection results are not input.

That is, the check box of the inspection result 1040 illustrated in FIG. 10 is input. If the display unit 105 is a touch display, the maintenance staff 102 can input a check by directly touching the check box.

For example, in a first row of the table illustrated in FIG. 10, with respect to "Is alert A001 not issued" (inspection item behavior 1030) of an alert 403 (inspection item 1020) of the refrigerator 400 (inspection portion 1010), a check is input for "True" when the alert A001 is not issued.

Further, for example, in a third row of the table illustrated in FIG. 10, with respect to "Is freezing function effective" (inspection item behavior 1030) of a freezing function 415 (inspection item 1020) of the freezing machine 410 (inspection portion 1010), a check is input for "True" when the freezing function is effective.

As described above, in the initial stage, the inspection results that can be known without performing the inspections such as disassembly of the device 104 are input. After the input, a diagnostic key 1050 is touched.

On the other hand, for example, in a second row of the table illustrated in FIG. 10, when "increase" (inspection item behavior 1030) of input power 465 (inspection item 1020) of the power supply portion 460 (inspection portion 1010) is unknown, a check is not input for "True" nor "False".

Then, the input inspection results 1040 are stored in the primary storage unit 155. In the primary storage unit 155, when the inspection result 1040 is "True", "1" is stored in the inspection result 640 illustrated in FIG. 6, and when the inspection result 1040 is "False", "0" is stored in the inspection result 640 illustrated in FIG. 6. When the inspection result 1040 is not input, the inspection result 640 illustrated in FIG. 6 is blank.

Thereafter, the processing proceeds to S710. S710 is a sub routine (SUB01) for calculating the probability of the failure mode based on the inspection result 1040 input in S705. Then, the sub routine (SUB01) is invoked.

Figure 8:
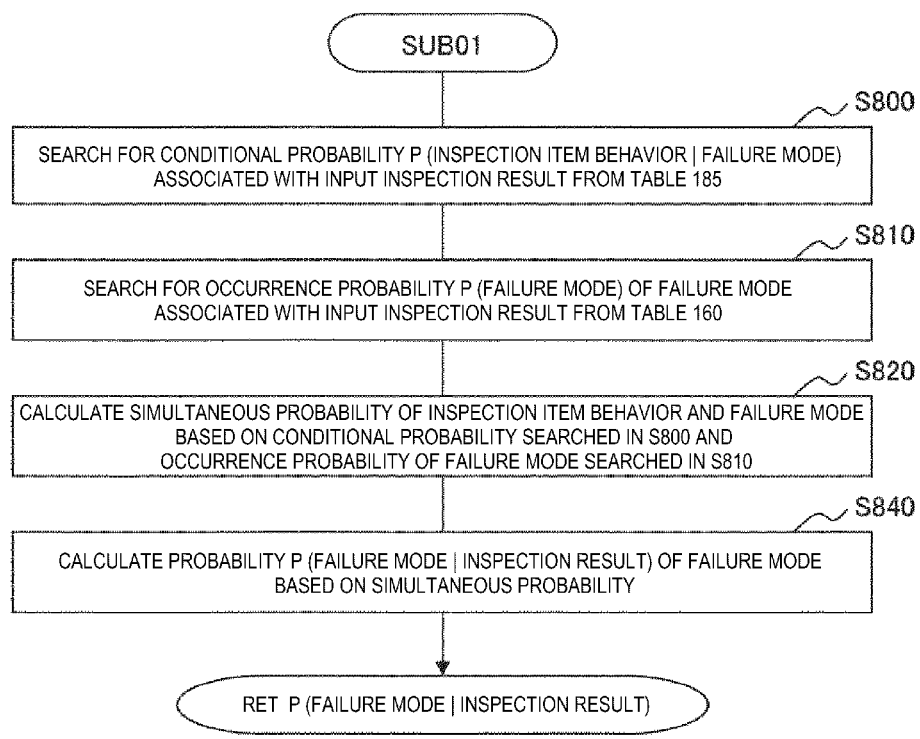
FIG. 8 is a flowchart illustrating a sub routine (SUB01) of the processing content described in the embodiment.

FIG. 8 is a flowchart illustrating the sub routine (SUB01) of the processing content described in the embodiment.

The sub routine illustrated in FIG.8 is a procedure executed by the failure mode probability calculation unit 175 to calculate the probability of the failure mode.

In S800, the conditional probability (probability at which the inspection item occurs) P (inspection item behavior failure mode) 230 and the failure mode 200 which are associated with the inspection result input in S705 are searched from the inspection item probability table 185 illustrated in FIG. 2. In particular, the search is performed when the inspection result 1040 is "False" or when the inspection result 1040 is not input.

In S810, the failure mode 310 same as the failure mode 200 searched in S800 is searched from the failure mode probability table 160 illustrated in FIG. 3. Then, based on the searched failure mode 310, the occurrence probability P (failure mode) 320 thereof is searched.

In S820, simultaneous probabilities P (a plurality of inspection item behaviors and a plurality of failure modes) of the inspection item behavior and the failure mode are calculated based on a plurality of conditional probabilities P (inspection item behavior 1 failure mode) searched in S800 and a plurality of occurrence probabilities P (failure mode) searched in S810.

This calculation is performed based on a Bayesian network. Hereinafter, a calculation method based on the Bayesian network will be briefly described.

FIG. 14 is an explanatory diagram illustrating an algorithm described in the embodiment, and illustrates the Bayesian network (algorithm) described in the embodiment.

This is a network in which failure modes (1410, 1420, and 1430) are associated with inspection item behaviors (1440, 1450, 1460, 1470, and 1480).

The failure modes (1410, 1420, and 1430) correspond to the failure mode 200 illustrated in FIG. 2, and the inspection item behaviors (1440, 1450, 1460, 1470, and 1480) correspond to information (the inspection portion 210, the inspection item 220, and the inspection item behavior 225) related to the inspection item behavior illustrated in FIG. 2.

An arrow line (for example, 1412, 1415 and the like) extending from a failure mode to an inspection item behavior corresponds to the conditional probability 230 from the failure mode to the inspection item behavior.

For example, "0.30" described on the arrow line 1412 extending from the failure mode to the inspection item behavior is the conditional probability P (inspection item behavior failure mode) 230 illustrated in FIG. 2. Further, for example, "0.005" described in the failure mode 1410 is the occurrence probability P (failure mode) P320 illustrated in FIG. 3.

In the Bayesian network illustrated in FIG. 14, when symbols such as F1 (F1 to F3 in FIG. 14) indicating the failure mode illustrated in FIG. 14 and $I_1$ ($I_1$ to $I_5$ in FIG. 14) indicating the inspection item behavior are used to represent the simultaneous probability P (a plurality of inspection item behaviors and a plurality of failure modes) of the inspection item behavior and the failure mode, the expression is as follow.

$$P(F_1=f_1, F_2=f_2, \ldots, F_j=f_j, I_1=i_1, I_2=i_2, \ldots, I_k=i_k)$$

The simultaneous probability P may be obtained by calculating the following Equation (1).

$$P(F_1=f_1, F_2=f_2, \ldots, F_J=f_J, I_1=i_1, I_2=i_2, \ldots, I_K=i_K) = \Pi_{k=1}^{K}(\Pi_{j=1}^{J}P(I_k=i_k|F_j=f_j)^{f_j})\Pi_{j=1}^{J}P(F_j=f_j) \quad (1)$$

The expression $P(I_k=i_k|F_j=f_j)$ represents the conditional probability P (inspection item behavior failure mode) 230 searched in S800, and in Equation (1), it is assumed that all J cases are searched.

The expression $P(F_j=f_j)$ represents the occurrence probability P (failure mode) 320 searched in S810, and in Equation (1), it is assumed that all K cases are searched.

Further, the value of $f_j$ is 1 (True) when the failure mode occurs, and is 0 (False) when the failure mode does not occur.

Further, $i_k$ is a value indicating an inspection result of the inspection item $i_k$. The $i_k$ is 1 (True) if the inspection result corresponds to the inspection item behavior, and is 0 (False) if the inspection result does not correspond to the inspection item behavior. Note that this value is obtained from the inspection result 640 illustrated in FIG. 6.

Equation (1) is derived by using factorization theorem and Noisy-OR model of the Bayesian network.

Then, after the calculation of Equation (1) is completed (S820 ends), the process proceeds to S840.

In S840, based on the simultaneous probability calculated in S820 and represented by the following expression:

$$P(F_1=f_1, F_2f_2, \ldots, F_j=f_j, I_1=i_1, I_2=i_2, \ldots, I_k=I_k),$$

a probability of the j-th failure mode reflecting the inspection result and represented by the following expression is calculated.

$$P(F_j=f_j|I_1=i_1, I_2=i_2, \ldots, I_k=I_k)$$

In order to obtain the probability of this failure mode, the following Equation (2) may be calculated.

$$P(F_j = f_j \mid I_1 = i_1, I_2 = i_2, \ldots, I_K = i_K) = \frac{\sum_{i \neq j}^{K} \sum_{f_i=0}^{f_i=1} P(F_1 = f_1, F_2 = f_2, \ldots, F_J = f_J, I_1 = i_1, I_2 = i_2, \ldots, I_K = i_K)}{\sum_{i=1}^{K} \sum_{f_i=0}^{f_i=1} P(F_1 = f_1, F_2 = f_2, \ldots, F_J = f_J, I_1 = i_1, I_2 = i_2, \ldots, I_K = i_K)} \quad (2)$$

Equation (2) indicates the conditional probability P in which the j-th failure mode $F_j$ equals to $f_j$ when the inspection results of the inspection items $I_1$ to $I_k$ are $i_1$ to $i_k$. This is a probability P of the failure mode (failure mode|inspection result) calculated based the inspection result.

Then, the probability of the failure mode calculated by the Equation (2) is returned, and the sub routine SUB01 ends.

As described above, the failure mode probability calculation unit 175 calculates the probability P of the failure mode (failure mode|inspection result) based on the conditional probability (at which the inspection item occurs) P (inspection item behavior|failure mode) 230, and the occurrence probability P (failure mode) 320.

Thereafter, the process proceeds to S715 illustrated in FIG. 7.

S715 is a sub routine (SUB02) to search for an inspection item candidate.

In step S715, "which inspection item is to be inspected next?" is determined from a viewpoint of failure mode isolation and the inspection cost. Then, the sub routine (SUB02) is invoked.

Figure 9:
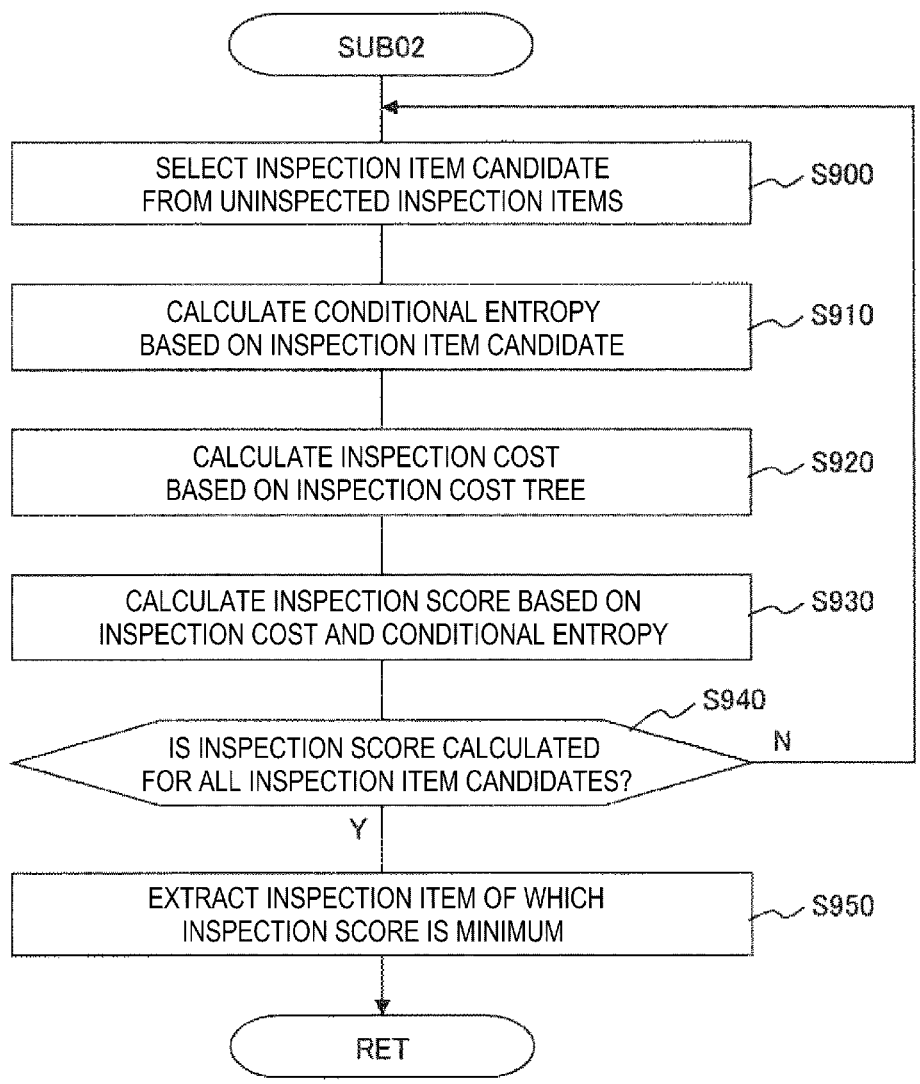
FIG. 9 is a flowchart illustrating a sub routine (SUB02) of the processing content described in the embodiment.

FIG. 9 is a flowchart illustrating the sub routine (SUB02) of the processing content described in the embodiment.

The sub routine illustrated in FIG. 9 is a procedure executed by the inspection item search unit 195 to search for an inspection item candidate (search for an inspection item whose inspection cost is the minimum).

In S900, one inspection item candidate is selected from the uninspected inspection items. This candidate becomes an inspection item $I_{k+1}$. In this regard, in the following steps, quality is evaluated from the viewpoint of the failure mode isolation and the inspection cost.

In S910, conditional entropy is calculated based on the inspection item candidate. That is, the conditional entropy (an index for ease of the failure mode isolation) represented by the following expression is calculated as an index for evaluating "If an inspection of an inspection item $I_u$, is newly executed, does the failure mode isolation proceed?"

$$H(F_1=f_1, F_2=f_2, \ldots, F_j=f_j|I_1=i_1, I_2=i_2, \ldots, I_k=i_k, I_{k+1})$$

The conditional entropy is one of indices indicating unintentional (randomness) with respect to a probability distribution, and as a value thereof becomes smaller, the randomness is lower. For example, a probability distribution in which probabilities of failure modes A, B and C are 33%, 33% and 34% has a lower conditional entropy rather than a probability distribution in which probabilities of the failure modes A, B and C are 90%, 5% and 5%.

That is, it is only necessary to search for an inspection item in which the conditional entropy can be expected to be as small as possible.

Therefore, conditional entropy when the inspection item selected in S900 is added is calculated by using the following Equation (3).

$$H(F_1 = f_1, F_2 = f_2, \ldots, \quad (3)$$
$$F_J = f_J \mid I_1 = i_1, I_2 = i_2, \ldots, I_K = i_K, I_{K+1}) =$$
$$\sum_{i_{K+1}=0}^{i_{K+1}=1} P(I_{K+1} = i_{K+1}) \sum_{j=1}^{J} \sum_{f_j=0}^{f_j=1} P(F_1 = f_1, F_2 = f_2, \ldots, F_J = f_J,$$
$$I_1 = i_1, I_2 = i_2, \ldots, I_K = i_K, I_{K+1} = i_{K+1})$$
$$\times \log_2(P(F_1 = f_1, F_2 = f_2, \ldots, F_J = f_J, I_1 = i_1,$$
$$I_2 = i_2, \ldots, I_K = i_K, I_{K+1}))$$

Note that the simultaneous probability described in this Equation (3) and represented by the following expression changes as the inspection items being changed from 1 to K to 1 to K+1.

$$P(F_1 = f_1, F_2 = f_2, \ldots, F_j = f_j, I_1 = i_1, I_2 = i_2, \ldots, I_k = i_k, I_{k+1} = i_{k+1})$$

That is, it can be calculated by replacing K in Equation (1) with K+1.

As a result, the probability $P(I_{k+1} = i_{k+1})$ required for the calculation of Equation (3) can also be calculated by using the following Equation (4).

$$P(I_{K+1} = i_{K+1}) = \quad (4)$$
$$\sum_{k=1}^{K} \sum_{i_k=0}^{i_k=1} \sum_{j=1}^{J} \sum_{f_j=0}^{f_j=1} P(F_1 = f_1, F_2 = f_2, \ldots, F_J = f_J, I_1 = i_1,$$
$$I_2 = i_2, \ldots, I_K = i_K, I_{K+1} = i_{K+1})$$

As a result, the conditional entropy represented by the following expression can be calculated.

$$H(F_1 = f_1, F_2 = f_2, \ldots, F_j = f_j \mid I_1 = i_1, I_2 = i_2, \ldots, I_k i_k, I_{k+1})$$

Then, after the calculation is completed (S910 ends), the process proceeds to S920.

In S920, an inspection cost $(I_{k+1})$ of the inspection item $I_{k+1}$ is calculated. That is, the inspection cost is calculated based on the inspection cost tree 180 illustrated in FIG. 4.

That is, a total value of the inspection costs is calculated based on paths indicated by the solid lines and the dotted lines illustrated in FIG. 4, and this total value is an answer of "With an inspection cost for executing an inspection of an inspection item $I_k$ as a current value, how much is the inspection cost for executing an inspection of an inspection item $I_{k+1}$?"

For example, assuming that the inspection item $I_k$ is "the freezing function 415 of the freezing machine 410" and the inspection item $I_{k+1}$ is "the outlet temperature 426 of the compressor 420", the inspection cost of the solid line 417 is 1 and the inspection cost of the dotted line 421 is 2, and thus, Cost $(I_{k+1})$=1+2=3.

In S930, an inspection score $(I_{k+1})$ is calculated based on the conditional entropy calculated in S910 and the inspection cost calculated in S920.

There are several possible definitions of the inspection score. In the present embodiment, Equation (5), which is a simple linear sum, is used.

$$\text{Score } (I_{k+1}) = H(F_1 = f_1, F_2 = f_2, \ldots, F_j = f_j \mid I_1 = i_1, I_2 = i_2, \ldots, I_k = i_k, I_{k+1}) + \lambda \text{Cost } (I_{k+1}) \quad (5)$$

A parameter λ described in Equation (5) is a design value of the maintenance recommendation system used in the present embodiment, which is determined from a viewpoint of "How important is inspection cost?" As the λ becomes larger, the inspection cost is more important, and the failure mode isolation is relatively neglected. Conversely, as the A becomes smaller, the inspection cost is less important, and the failure mode isolation is relatively valued.

In S940, whether or not an inspection score is calculated for all candidates of the uninspected inspection items is confirmed. That is, whether or not all the inspection scores Score $(I_{k+1})$ are calculated is confirmed.

If not all of the inspection scores Score $(I_{K+1})$ are calculated, the process returns to S900, another inspection item is assigned as the (K+1)-th inspection item, and the inspection score $(I_{K+1})$ is calculated.

On the other hand, if all of the inspection scores Score $(I_{K+1})$ are calculated, the process proceeds to S950.

In S950, an inspection item of which the calculated inspection score Score $(I_{K+1})$ is the minimum is extracted.

Then, the inspection item of which the inspection score Score $(I_{K+1})$ calculated by Equation (5) is the minimum is returned, and this sub routine SUB02 ends.

As described above, the inspection item search unit 195 extracts the inspection item with the minimum inspection score. That is, the inspection item search unit 195 calculates the conditional entropy based on the uninspected inspection items, calculates the inspection cost based on the inspection cost tree, and calculates the inspection score based on the conditional entropy and the inspection cost.

Thereafter, the process proceeds to S720 illustrated in FIG. 7.

In S720, the failure mode candidates and the inspection item candidates are displayed on the display unit 105 of the terminal 100.

Figure 11:
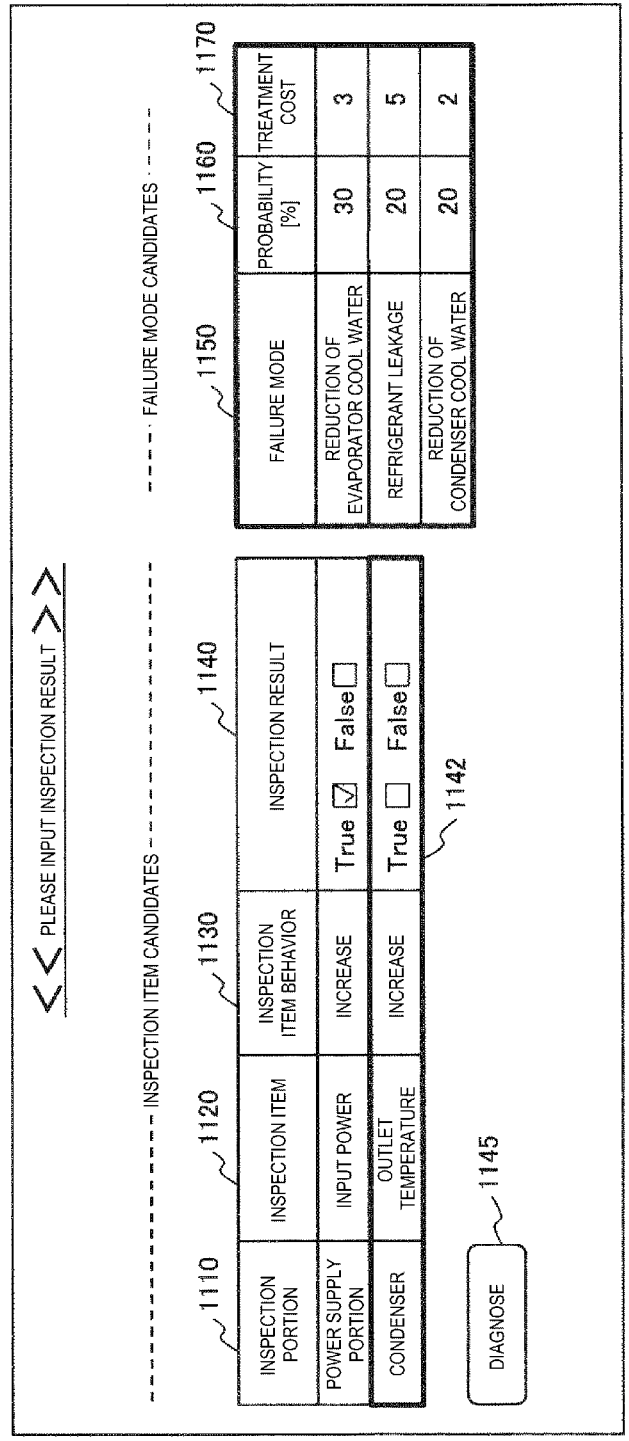
FIG. 11 is an explanatory diagram illustrating inspection item candidates and failure mode candidates displayed by the display unit 105 described in the embodiment.

FIG. 11 is an explanatory diagram illustrating the inspection item candidates and the failure mode candidates displayed by the display unit 105 described in the embodiment.

In S720, top N cases with high probabilities of the failure mode calculated in S710 are set as the failure mode candidates, and a probability (%) 1160 and a treatment cost 1170 are displayed together with the failure mode 1150. The number of N cases is determined at the time of designing a maintenance recommendation system used in the present embodiment based on a screen size and the like. In the present embodiment, N=3.

As the treatment cost 1170, the treatment cost 520 stored in the failure mode risk table 170 illustrated in FIG. 5 is displayed.

In addition, an inspection portion 1110, an inspection item 1120, an inspection item behavior 1130 and an inspection result 1140 are displayed as the inspection item candidates. Here, the inspection item (1142) which is selected in S715 and for which the inspection result is not input when the initial information is input is displayed at the bottom of the table.

In the present embodiment, the inspection portion 1110, the inspection item 1120, and the inspection item behavior 1130 for which the inspection result is already input are not displayed. Therefore, the maintenance staff 102 can easily recognize the uninspected inspection items.

In S725, the maintenance staff 102 confirms whether the failure modes are narrowed down. That is, the maintenance staff 102 confirms whether or not the failure modes are narrowed down by referring to the failure mode 1150, the probability (%) 1160 and the treatment cost 1170.

For example, when it is determined that the failure mode is narrowed down with probabilities of 30% for reduction of evaporator cool water, 20% for refrigerant leakage, and 20% for reduction of condenser cool water illustrated in FIG. 11, the failure mode can be identified (the inspection ends and the main routine ends) and the failure is treated.

On the other hand, when it is determined that the failure mode cannot be narrowed down with these probabilities (%) 1160, the process proceeds to S730, and an inspection of the inspection item candidate (1142) is executed.

In S730, since it is determined that the failure mode cannot be narrowed down yet, the inspection of the inspection item candidate is executed. In this embodiment, an inspection (an inspection of the inspection item candidate (1142)) is performed to determine whether or not the outlet temperature (inspection item 1220) of the condenser (inspection portion 1210) is increased (inspection item behavior 1230). In the present embodiment, an inspection of the inspection item (whether or not an input power of the power supply portion is increased) for which the inspection result is not input during the input of the initial information is ended.

In S735, the inspection results thereof are input.

Figure 12:
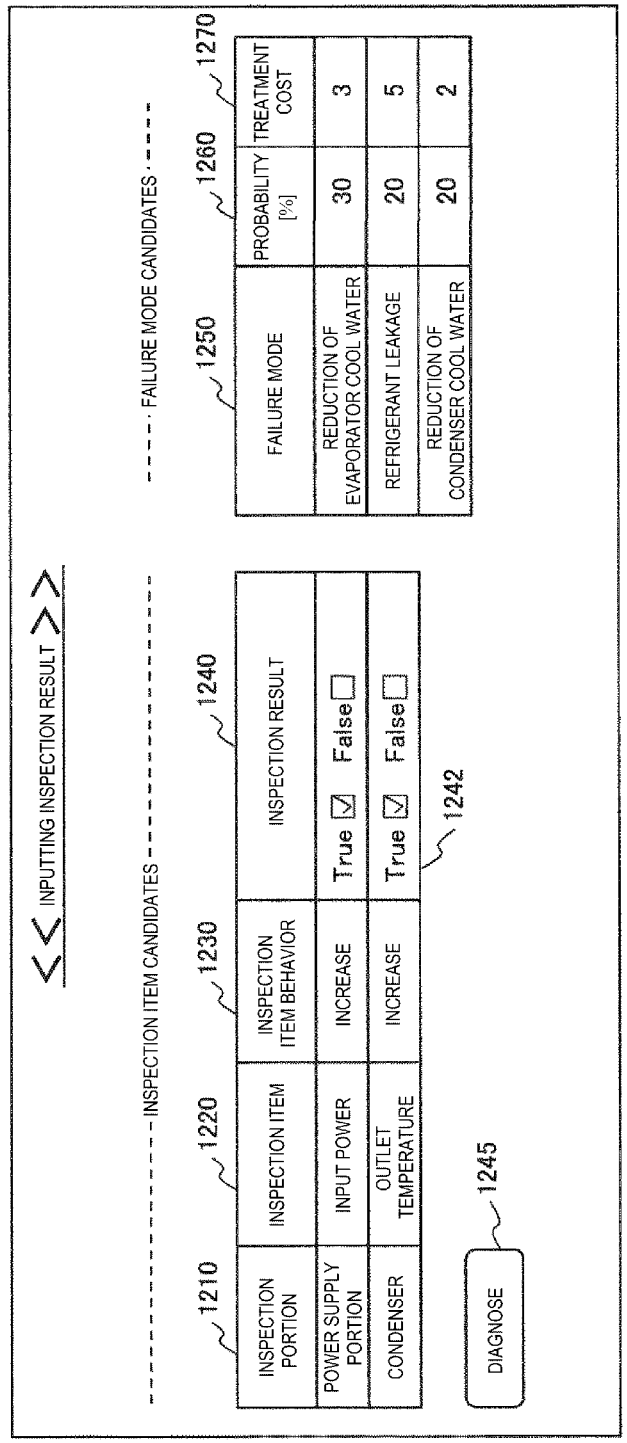
FIG. 12 is an explanatory diagram illustrating input of an inspection result displayed by the display unit 105 described in the embodiment.

FIG. 12 is an explanatory diagram illustrating input of the inspection results displayed by the display unit 105 described in the embodiment.

The inspection results are input into the checkboxes as a check (1242). After that, the process returns to S710 to calculate the failure mode candidate and the inspection item candidate. After the input, the diagnostic key 1245 is touched.

Note that a failure mode 1250, a probability (%) 1260, a treatment cost 1270, an inspection portion 1210, an inspection item 1220, an inspection item behavior 1230, an inspection result 1240, and a diagnosis key 1245 illustrated in FIG. 12 are the same as the failure mode 1150, the probability (%) 1160, the treatment cost 1170, the inspection portion 1110, the inspection item 1120, the inspection item behavior 1130, the inspection result 1140, and the diagnostic key 1145 illustrated in FIG. 11.

Figure 13:
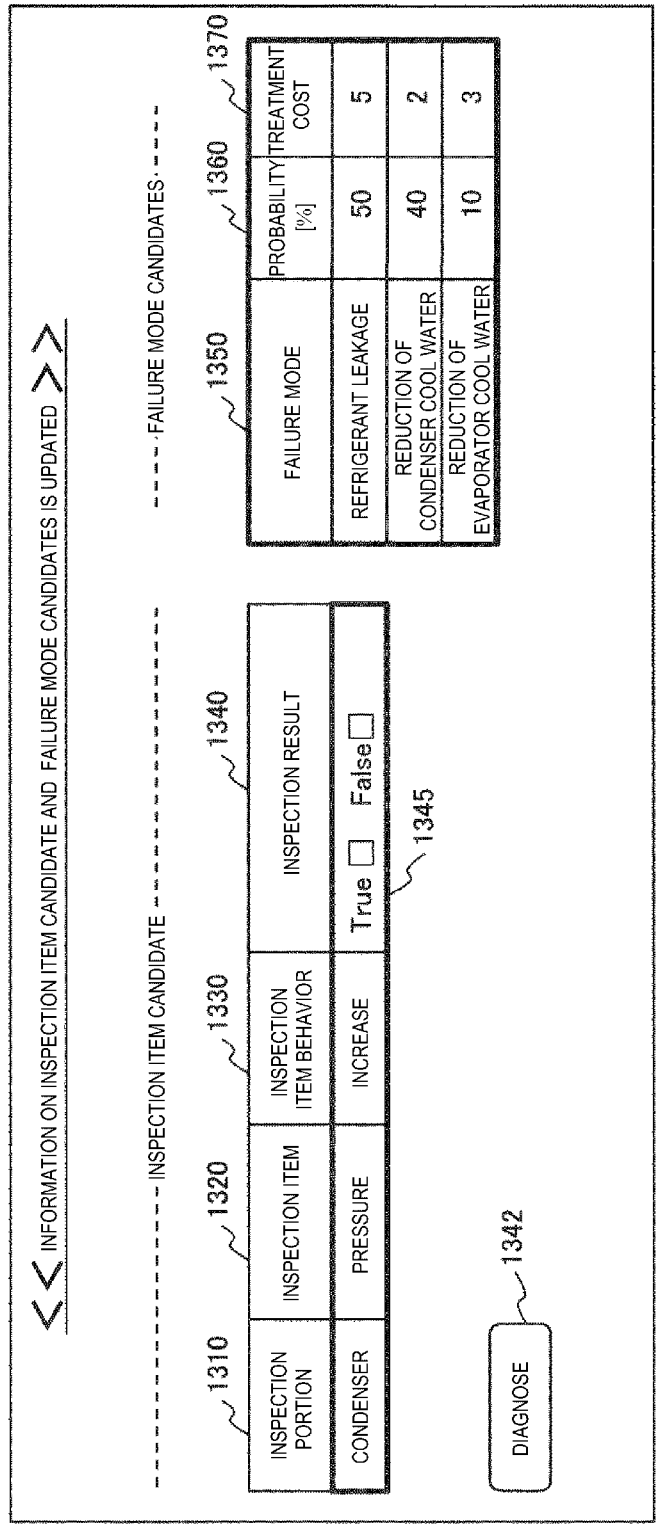
FIG. 13 is an explanatory diagram illustrating update of an inspection item candidate and failure mode candidates displayed by the display unit 105 described in the embodiment.

FIG. 13 is an explanatory diagram illustrating the update of an inspection item candidate and failure mode candidates displayed by the display unit 105 described in the embodiment.

As described above, by repeating S710 to S735, a failure mode 1350, a probability (%) 1360, and a treatment cost 1370 are changed as the failure mode candidates, and an inspection item (1345) is displayed in a table as the inspection item candidate.

In this embodiment, an inspection (inspection of the inspection item candidate (1345)) is performed to determine whether or not the pressure (inspection item 1320) of the condenser (inspection portion 1310) is increased (inspection item behavior 1330).

In this way, by adding the inspection results from the inspection items illustrated in FIG. 11 to the inspection items illustrated in FIG. 13 and biasing the probabilities of the failure modes, accuracy of failure mode identification can be improved.

When the maintenance staff 102 determines that the failure modes are narrowed down, the failure mode can be identified, the inspection is ended, the main routine is completed, and the failure thereof is treated.

In the present embodiment, the inspection portion 1310, the inspection item 1320, and the inspection item behavior 1330 for which the inspection result is already input are not displayed. Therefore, the maintenance staff 102 can easily recognize the uninspected inspection items.

In the maintenance recommendation system described in the present embodiment, the probability of the failure mode is calculated with at least one inspection result being input, and "which inspection item is to be inspected next" is recommended to the maintenance staff 102 from viewpoints of the probability of the failure mode and the treatment cost of the treatment cost.

The maintenance staff 102 performs an inspection of the inspection items on each portion of the device based on the probability of the failure mode and the treatment cost of the failure mode. For example, in a case (a) where there are three types of failure modes A, B and C, and the probabilities of these failure modes are 33%, 33% and 34%, the maintenance staff 102 cannot narrow down a specific failure mode, but in a case (b) where the probabilities of these failure modes are 90%, 5%, and 5%, the maintenance staff 102 can narrow down to the failure mode A.

In the case (a), for example, an inspection for a failure mode with the lowest treatment cost is performed, after an inspection result thereof is input, the probability of the failure mode is calculated, and "which inspection item is to be inspected next" is recommended to the maintenance staff 102.

As described above, in the maintenance recommendation system described in the present embodiment, by interaction with the maintenance staff 102, and further sequentially repeating and adding, "which inspection item is to be inspected next" is recommended to the maintenance staff 102.

According to the present embodiment, such sequentially repeating and adding can be performed and the inspection results can be presented timely, so that a failure mode can be identified with high accuracy at an early stage.

According to the present embodiment described above, the inspection item is presented timely in the halfway of the inspection, the accuracy of failure mode identification is improved, the failure mode is identified at an early stage, meanwhile, the time required for investigating a content of the failure is reduced, and the time from device failure to reset is shortened.

The invention is not limited to the above embodiment, and includes various modifications. For example, the above-described embodiment is described in detail for easy understanding of the invention, and the invention is not necessarily limited to those including all the configurations described above.

What is claimed is:

1. A maintenance recommendation system comprising:
   a primary storage unit that stores:
   an input inspection result of equipment,
   an inspection item probability table including a plurality of entries, each entry including a failure mode, an inspection portion of the equipment, an inspection item of the equipment, an inspection item behavior indicating a state of the inspection item, and a conditional probability indicating a probability at which the inspection item is in the state according to the inspection item behavior, and
   a failure mode probability table that stores a plurality of entry indicating one of the failure modes and a respective corresponding occurrence probability indicating a probability the corresponding failure mode occurs;
   a display unit that displays a user interface indicating the inspection portion, the inspection item, and the inspection item behavior of one of the plurality of entries of the inspection item probability table and displaying an interface configured to receive a selection indicating whether the inspection result is true or false;

a failure mode probability calculation unit that, upon determining the selection is false, obtain a first failure mode and a first conditional probability corresponding to the failure mode based on the displayed inspection portion, inspection item, and the inspection item behavior having the false selection from the inspection item probability table, obtain a first occurrence probability based on the obtained first failure mode from the failure mode probability table, and calculate a probability of a failure mode based on the obtained first conditional probability and the obtained first occurrence probability;

an inspection item search unit that is configured to extract an inspection item with a minimum inspection score from uninspected inspection items; and a main routine operation unit that is configured to narrow down a failure mode candidate and an inspection item candidate from all inspection items.

2. The maintenance recommendation system according to claim 1, further comprising:

an inspection cost tree that stores inspection costs in a tree-diagram; and a failure mode risk table that stores a treatment cost of the failure mode.

3. The maintenance recommendation system according to claim 1, wherein the inspection item search unit is configured to calculate conditional entropy based on uninspected inspection items, to calculate an inspection cost based on an inspection cost tree, and to calculate an inspection score based on the conditional entropy and the inspection cost.

4. The maintenance recommendation system according to claim 1, wherein the input inspection result is executed with respect to an inspection item behavior of an inspection portion.

5. The maintenance recommendation system according to claim 1, wherein the failure mode candidate is displayed with a respective failure mode, a probability of the failure mode, and a treatment cost of the failure mode.

6. The maintenance recommendation system according to claim 1, wherein an inspection item of which an inspection result is already input is not displayed in the inspection item candidate.

* * * * *